United States Patent
Lauer et al.

(10) Patent No.: US 12,511,568 B2
(45) Date of Patent: Dec. 30, 2025

(54) TARGET QUBIT DECOUPLING IN AN ECHOED CROSS-RESONANCE GATE

(71) Applicant: International Business Machines Corporation, Armonk, NY (US)

(72) Inventors: Isaac Lauer, Chappaqua, NY (US); Neereja Sundaresan, Mount Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 359 days.

(21) Appl. No.: 18/322,768

(22) Filed: May 24, 2023

(65) Prior Publication Data

US 2024/0235698 A1  Jul. 11, 2024

Related U.S. Application Data

(62) Division of application No. 16/795,149, filed on Feb. 19, 2020, now Pat. No. 11,695,483.

(51) Int. Cl.
*H01S 4/00* (2006.01)
*G06N 10/40* (2022.01)
(Continued)

(52) U.S. Cl.
CPC ............ *G06N 10/40* (2022.01); *G06N 10/60* (2022.01); *H04B 10/90* (2013.01)

(58) Field of Classification Search
CPC ........ G06N 10/10; G06N 10/20; G06N 10/40; G06N 10/60; G06N 10/70; G06N 10/80; H04B 10/70
See application file for complete search history.

(56) References Cited

U.S. PATENT DOCUMENTS 8,294,138 B2 * 10/2012 Farinelli ................ B82Y 10/00
                                                             257/14
9,858,531 B1    1/2018 Monroe et al.
(Continued)

FOREIGN PATENT DOCUMENTS

CN      107408223 A    11/2017
CN      109416764 A     3/2019
(Continued)

OTHER PUBLICATIONS

Mell et al., "The NIST Definition of Cloud Computing," Recommendations of the National Institute of Standards and Technology, NIST Special Publication 800-145, Sep. 2011, 7 pages.
(Continued)

*Primary Examiner* — Tuan Pham
(74) *Attorney, Agent, or Firm* — Amin, Turocy & Watson, LLP

(57) ABSTRACT

Systems, computer-implemented methods, and/or computer program products that can facilitate target qubit decoupling in an echoed cross-resonance gate are provided. According to an embodiment, a computer-implemented method can comprise receiving, by a system operatively coupled to a processor, both a cross-resonance pulse and a decoupling pulse at a target qubit. The cross-resonance pulse propagates to the target qubit via a control qubit. The computer-implemented method can further comprise receiving, by the system, a state inversion pulse at the control qubit. The computer-implemented method can further comprise receiving, by the system, both a phase-inverted cross-resonance pulse and a phase-inverted decoupling pulse at the target qubit. The phase-inverted cross-resonance pulse propagates to the target qubit via the control qubit.

10 Claims, 10 Drawing Sheets

(51) Int. Cl.
   *G06N 10/60*       (2022.01)
   *H04B 10/90*       (2013.01)

(56) References Cited

U.S. PATENT DOCUMENTS

| | | | |
|---|---|---|---|
| 10,056,908 | B2 | 8/2018 | Rigetti et al. |
| 10,171,088 | B1 | 1/2019 | Kim et al. |
| 10,223,643 | B1 | 3/2019 | Bishop et al. |
| 10,282,675 | B2 | 5/2019 | Bloom et al. |
| 10,352,992 | B1* | 7/2019 | Zeng ............... G06N 10/20 |
| 10,483,980 | B2 | 11/2019 | Sete et al. |
| 11,170,317 | B2 | 11/2021 | Chow et al. |
| 2018/0032894 | A1 | 2/2018 | Epstein |
| 2018/0225586 | A1 | 8/2018 | Chow et al. |
| 2019/0020346 | A1* | 1/2019 | Wang ............... H04B 10/70 |
| 2019/0156236 | A1 | 5/2019 | Bishop et al. |
| 2019/0363688 | A1 | 11/2019 | Egan et al. |
| 2019/0378033 | A1 | 12/2019 | Figgatt et al. |

FOREIGN PATENT DOCUMENTS

| | | |
|---|---|---|
| CN | 110073375 A | 8/2019 |
| CN | 115136156 A | 9/2022 |
| EP | 4107675 A1 | 12/2022 |
| JP | 2016-518637 A | 6/2016 |
| JP | 2018-128857 A | 8/2018 |
| JP | 2019-035892 A | 3/2019 |
| JP | 2023-514097 A | 4/2023 |
| WO | 2016/126979 A1 | 8/2016 |
| WO | 2021/165108 A1 | 8/2021 |

OTHER PUBLICATIONS

Corcoles et al., "Process verification of two-qubit quantum gates by randomized benchmarking," arXiv:1210.7011v2 [quant-ph], Nov. 2, 2012, 9 pages.

Koch et al., "Charge-insensitive qubit design derived from the Cooper pair box," Physical Review A, vol. 76; Issue 4, Oct. 12, 2007, 19 pages.

Rigetti et al., "Fully microwave-tunable universal gates in superconducting qubits with linear couplings and fixed transition frequencies," Physical Review B, vol. 81, Issue 13, Apr. 5, 2010, 7 pages.

Chow et al., "A simple all-microwave entangling gate for fixed-frequency superconducting qubits," arXiv:1106.0553v1 [quant-ph], Jun. 3, 2011, 5 pages.

Sheldon et al., "Procedure for systematically tuning up crosstalk in the cross resonance gate," arXiv:1603.04821v1 [quant-ph], Mar. 15, 2016, 6 pages.

International Search Report and Written Opinion for International Application No. PCT/EP2021/053136 dated Jun. 11, 2021, 11 pages.

Hazra, et al., "Engineering Cross Resonance Interaction in Multi-modal Quantum Circuits," arXiv:1912.10953v1 [quant-ph] Dec. 23, 2019, 11 pages.

Non-Final Office Action received for U.S. Appl. No. 16/795,149, dated Mar. 28, 2022, 25 pages.

Final Office Action received for U.S. Appl. No. 16/795,149, dated Sep. 9, 2022, 10 pages.

Notice of Allowance received for U.S. Appl. No. 16/795,149, dated Feb. 22, 2023, 16 pages.

Response to the communication pursuant to R 161 (1) and R 162 EPC received for European Patent Application Serial No. 21705139.0 dated Mar. 28, 2023, 3 pages.

Notice of Allowance received for U.S. Appl. No. 16/795,149, dated May 4, 2023, 6 pages.

List of IBM Patents or Applications Treated as Related (2 pages), May 23, 2023.

Chow et al. "Microwave-Controlled Universal Entangling Gate for Fixed Frequency Superconducting Qubits", IBM Research Report, Jul. 14, 2011, 6 pages, https://dominoweb.draco.res.ibm.com/b9ae2fccced129e5852578d400526cbd.html.

Guo et al., "Dephasing-insensitive quantum information storage and processing with superconducting qubits", Physical Review Letters 121(13), Sep. 2018, 10 Pages.

The State Intellectual Property Office of People's Republic of China, "First Office action", Jan. 24, 2025, 11 Pages, CN Application No. 202180015872.3.

The State Intellectual Property Office of People's Republic of China, "Notification of Grant", Apr. 28, 2025, 8 Pages, CN Application Number 202180015872.3.

Decision to Grant a Patent received for Japanese Patent Application Serial No. 2022-546051 dated Aug. 6, 2024, 5 pages(Including English Translation).

European Patent Office, "Communication pursuant to Article 94(3) EPC", Oct. 22, 2025, 06 pages, EP Application No. 21705139.0.

\* cited by examiner

TARGET QUBIT DECOUPLING IN AN ECHOED CROSS-RESONANCE GATE

BACKGROUND

The subject disclosure relates to an echoed cross-resonance gate, and more specifically, to target qubit decoupling in an echoed cross-resonance gate.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that can facilitate target qubit decoupling in an echoed cross-resonance gate are described.

According to an embodiment, a computer-implemented method can comprise receiving, by a system operatively coupled to a processor, both a cross-resonance pulse and a decoupling pulse at a target qubit. The cross-resonance pulse propagates to the target qubit via a control qubit. The computer-implemented method can further comprise receiving, by the system, a state inversion pulse at the control qubit. The computer-implemented method can further comprise receiving, by the system, both a phase-inverted cross-resonance pulse and a phase-inverted decoupling pulse at the target qubit. The phase-inverted cross-resonance pulse propagates to the target qubit via the control qubit.

According to another embodiment, a system can comprise a processor that executes computer executable components stored in a memory. The system can further comprise a control qubit operatively coupled to the processor and that receives a cross-resonance pulse, a state inversion pulse, and a phase-inverted cross-resonance pulse. The system can further comprise a target qubit coupled to the control qubit and that receives the cross-resonance pulse, a decoupling pulse, the phase-inverted cross-resonance pulse, and a phase-inverted decoupling pulse. The cross-resonance pulse and the phase-inverted cross-resonance pulse propagate to the target qubit via the control qubit.

According to another embodiment, a computer-implemented method can comprise applying, by a system operatively coupled to a processor, a first pulse signal to a control qubit having a first resonant frequency. The computer-implemented method can further comprise applying, by the system, a second pulse signal to a target qubit coupled to the control qubit, the target qubit having a second resonant frequency. The first and the second pulse signals are at the second resonant frequency and in phase at the target qubit. The computer-implemented method can further comprise applying, by the system, a third pulse signal to the control qubit at the first resonant frequency for creating an inverted state relative to a current state of the control qubit. The computer-implemented method can further comprise applying, by the system, a fourth pulse signal to the control qubit. The computer-implemented method can further comprise applying, by the system, a fifth pulse signal to the target qubit. The fourth and the fifth pulse signals are at the second resonant frequency and are in phase at the target qubit. The fourth and fifth pulse signals include a substantially 180 degree phase difference relative to the respective first and second pulse signals.

According to another embodiment, a system can comprise a memory that stores computer executable components and a processor that executes the computer executable components stored in the memory. The computer executable components can comprise a cross-resonance pulse component that applies a first pulse signal to a control qubit having a first resonant frequency. The computer executable components can further comprise a decoupling pulse component that applies a second pulse signal to a target qubit coupled to the control qubit, the target qubit having a second resonant frequency. The first and the second pulse signals are at the second resonant frequency and in phase at the target qubit. The computer executable components can further comprise a state inversion pulse component that applies a third pulse signal to the control qubit at the first resonant frequency for creating an inverted state relative to a current state of the control qubit. The computer executable components can further comprise a phase-inverted cross-resonance pulse component that applies a fourth pulse signal to the control qubit. The computer executable components can further comprise a phase-inverted decoupling pulse component that applies a fifth pulse signal to the target qubit. The fourth and the fifth pulse signals are at the second resonant frequency and are in phase at the target qubit. The fourth and fifth pulse signals include a substantially 180 degree phase difference relative to the respective first and second pulse signals.

According to another embodiment, a computer-implemented method can comprise applying, by a system operatively coupled to a processor, a cross-resonance pulse having a first pulse period to a control qubit coupled to a target qubit. The computer-implemented method can further comprise applying, by the system, a decoupling pulse having a second pulse period to the target qubit. The cross-resonance pulse and the decoupling pulse are at a resonant frequency of the target qubit and in phase at the target qubit. The computer-implemented method can further comprise applying, by the system, a phase-inverted decoupling pulse having a third pulse period to the target qubit at the resonant frequency of the target qubit and including a substantially 180 degree phase difference relative to the cross-resonance pulse and the decoupling pulse at the target qubit.

DETAILED DESCRIPTION

Figure 1:
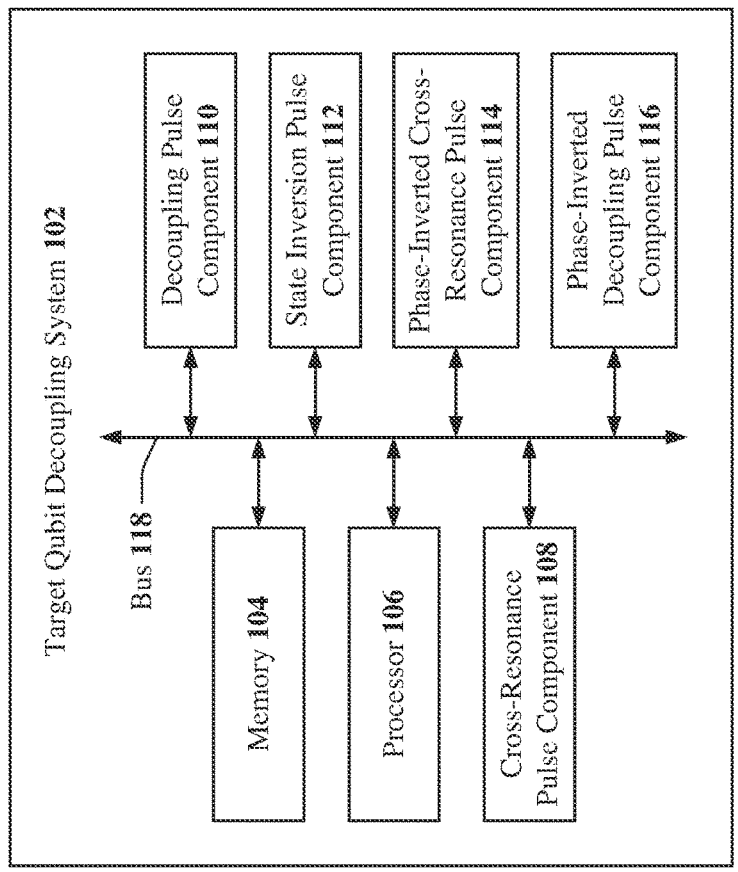
FIG. 1 illustrates a block diagram of an example, non-limiting system that can facilitate target qubit decoupling in an echoed cross-resonance gate in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Cross-resonance (CR) gates are an entangling two-quantum bit (two-qubit) gate that can be used with single qubit gates to define a complete basis set for universal quantum computing. Current implementations of cross-resonance gates suffer from coherent error sources that may be corrected in various ways, and incoherent error sources that present a fundamental limit on error (the coherence limit).

For superconducting qubits, the cross-resonance gate is achieved on a pair of coupled qubits by driving one (e.g., driving the control qubit) at the fundamental frequency of the other (e.g., the target qubit) using microwave pulses. Undesired couplings can lead to coherent error preventing the error rate of the gate from reaching the coherence limit.

Some existing techniques that attempt to eliminate such undesired couplings that can lead to coherent error involve implementing an "echoed" cross-resonance gate. An echoed cross-resonance gate splits the operation in two, where one half of the operation is performed, the control qubit state is inverted, and the second half is performed with the opposite phase. A problem with this technique is that it only cancels some, but not all, sources of coherent error. For example, one current technique uses pulses applied to the target qubit to correct for IX and IY rotations on the target caused by the cross-resonance pulse. The design of those pulses is intended leave only ZX rotations on the target to implement the cross-resonance gate (e.g., is intended to leave some Z errors).

Given the problems described above with current implementations of cross-resonance gates and/or echoed cross-resonance gates that suffer from coherent error sources, the present disclosure can be implemented to produce a solution to such problems in the form of systems, computer-implemented methods, and/or computer program products that can: apply a first pulse signal to a control qubit having a first resonant frequency; apply a second pulse signal to a target qubit coupled to the control qubit, the target qubit having a second resonant frequency, where the first and the second pulse signals are at the second resonant frequency and in phase at the target qubit; apply a third pulse signal to the control qubit at the first resonant frequency for creating an inverted state relative to a current state of the control qubit; apply a fourth pulse signal to the control qubit; and apply a fifth pulse signal to the target qubit, where the fourth and the fifth pulse signals are at the second resonant frequency and are in phase at the target qubit, and where the fourth and fifth pulse signals include a substantially 180 degree (180°) phase difference relative to the respective first and second pulse signals. By applying (e.g., simultaneously) both cross-resonance pulses and decoupling pulses to the target qubit that are in phase at the target qubit (e.g., applying a large IX rotation to the target qubit to substantially cancel Z errors), the present disclosure can reduce the impact that undesired error sources apply to two-qubit gates (e.g., a cross-resonance gate, an echoed cross-resonance gate, etc.) during gate operation and thereby improve computational power of a quantum computer comprising such gates.

FIG. 1 illustrates a block diagram of an example, non-limiting system 100 that can facilitate target qubit decoupling in an echoed cross-resonance gate in accordance with one or more embodiments described herein. In some embodiments, system 100 can comprise a target qubit decoupling system 102, which can be associated with a cloud computing environment. For example, target qubit decoupling system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

In some embodiments, target qubit decoupling system 102 and/or components thereof (e.g., cross-resonance pulse component 108, decoupling pulse component 110, state inversion pulse component 112, phase-inverted cross-resonance pulse component 114, phase-inverted decoupling pulse component 116, etc.) can employ one or more computing resources of cloud computing environment 950 described below with reference to FIG. 9 and/or one or more functional abstraction layers described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, etc.) and/or one or more quantum computing devices (e.g., quantum computer, quantum processor, quantum circuit simulation software, superconducting circuit, etc.) that can be employed by target qubit decoupling system 102 and/or components thereof to execute one or more operations in accordance with one or more embodiments of the subject disclosure described herein. For instance, target qubit decoupling system 102 and/or components thereof can employ such one or more classical and/or quantum computing devices to execute one or more mathematical functions and/or equations, one or more computing and/or processing scripts, one or more models (e.g., artificial intelligence (AI) models, machine learning (ML) models, etc.), one or more classical and/or quantum algorithms, and/or another operation in accordance with one or more embodiments of the subject disclosure described herein. In another example, target qubit decoupling system 102 and/or components thereof can employ such one or more classical and/or quantum computing devices to train one or more models (e.g., artificial intelligence (AI) models, machine learning (ML) models, etc.).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Continuing now with FIG. 1. According to several embodiments, target qubit decoupling system 102 can comprise a memory 104, a processor 106, a cross-resonance pulse component 108, a decoupling pulse component 110, a state inversion pulse component 112, a phase-inverted cross-resonance pulse component 114, a phase-inverted decoupling pulse component 116, and/or a bus 118.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or target qubit decoupling system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to target qubit decoupling system 102, cross-resonance pulse component 108, decoupling pulse component 110, state inversion pulse component 112, phase-inverted cross-resonance pulse component 114, phase-inverted decoupling pulse component 116, and/or another component associated with target qubit decoupling system 102 as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Target qubit decoupling system 102, memory 104, processor 106, cross-resonance pulse component 108, decoupling pulse component 110, state inversion pulse component 112, phase-inverted cross-resonance pulse component 114, phase-inverted decoupling pulse component 116, and/or another component of target qubit decoupling system 102 as described herein can be communicatively, electrically, operatively, and/or optically coupled to one another via a bus 118 to perform functions of system 100, target qubit decoupling system 102, and/or any components coupled therewith. In several embodiments, bus 118 can comprise one or more memory bus, memory controller, peripheral bus, external bus, local bus, a quantum bus, and/or another type of bus that can employ various bus architectures. Further examples of bus 118 are described below with reference to system bus 818 and FIG. 8. Such examples of bus 118 can be employed to implement any embodiments of the subject disclosure.

Target qubit decoupling system 102 can comprise any type of component, machine, device, facility, apparatus, and/or instrument that comprises a processor and/or can be capable of effective and/or operative communication with a wired and/or wireless network. All such embodiments are envisioned. For example, target qubit decoupling system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Target qubit decoupling system 102 can be coupled (e.g., communicatively, electrically, operatively, optically, etc.) to one or more external systems, sources, and/or devices (e.g., classical and/or quantum computing devices, communication devices, etc.) via a data cable (e.g., High-Definition Multimedia Interface (HDMI), recommended standard (RS) 232, Ethernet cable, etc.). In some embodiments, target qubit decoupling system 102 can be coupled (e.g., communicatively, electrically, operatively, optically, etc.) to one or more external systems, sources, and/or devices (e.g., classical and/or quantum computing devices, communication devices, etc.) via a network.

In some embodiments, such a network can comprise wired and wireless networks, including, but not limited to, a cellular network, a wide area network (WAN) (e.g., the Internet) or a local area network (LAN). For example, target qubit decoupling system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, target qubit decoupling system 102 can thus include hardware (e.g., a central processing unit (CPU), a transceiver, a decoder, a quantum processor, etc.), software (e.g., a set of threads, a set of processes, software in execution, quantum pulse schedule, quantum circuit, etc.) or a combination of hardware and software that facilitates communicating information between target qubit decoupling system 102 and external systems, sources, and/or devices (e.g., computing devices, communication devices, etc.).

Target qubit decoupling system 102 can comprise one or more computer and/or machine readable, writable, and/or executable components and/or instructions that, when executed by processor 106 (e.g., a classical processor, a quantum processor, etc.), can facilitate performance of operations defined by such component(s) and/or instruction(s). Further, in numerous embodiments, any component associated with target qubit decoupling system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, cross-resonance pulse component 108, decoupling pulse component 110, state inversion pulse component 112, phase-inverted cross-resonance pulse component 114, phase-inverted decoupling pulse component 116, and/or any other components associated with target qubit decoupling system 102 as disclosed herein (e.g., communicatively, electronically, operatively, and/or optically coupled with and/or employed by target qubit decoupling system 102), can comprise such computer and/or machine readable, writable, and/or executable component(s) and/or instruction(s). Consequently, according to numerous embodiments, target qubit decoupling system 102 and/or any components associated therewith as disclosed herein, can employ processor 106 to execute such computer and/or machine readable, writable, and/or executable component(s) and/or instruction(s) to facilitate performance of one or more operations described herein with reference to target qubit decoupling system 102 and/or any such components associated therewith.

Target qubit decoupling system 102 can facilitate performance of operations executed by and/or associated with cross-resonance pulse component 108, decoupling pulse component 110, state inversion pulse component 112, phase-inverted cross-resonance pulse component 114, phase-inverted decoupling pulse component 116, and/or another component associated with target qubit decoupling system 102 as disclosed herein. For example, as described in detail below, target qubit decoupling system 102 can facilitate via processor 106 (e.g., a classical processor, a quantum processor, etc.): receiving both a cross-resonance pulse and a decoupling pulse at a target qubit, where the cross-resonance pulse propagates to the target qubit via a control qubit; receiving a state inversion pulse at the control qubit; and/or receiving both a phase-inverted cross-resonance pulse and a phase-inverted decoupling pulse at the target qubit, where the phase-inverted cross-resonance pulse propagates to the target qubit via the control qubit. In an example, target qubit decoupling system 102 can further facilitate via processor 106 (e.g., a classical processor, a quantum processor, etc.): receiving both the cross-resonance pulse and the decoupling pulse simultaneously at the target qubit; and/or receiving both the phase-inverted cross-resonance pulse and the phase-inverted decoupling pulse simultaneously at the target qubit, thereby facilitating at least one of improved error rate of a quantum gate comprising the target qubit and the control qubit, improved fidelity of the quantum gate, or improved fidelity of a quantum device comprising the quantum gate. In an example, the cross-resonance pulse and the phase-inverted cross-resonance pulse comprise substantially same amplitudes and pulse periods and/or substantially same 180 degree (180°) phase differences. In an example, the decoupling pulse and the phase-inverted decoupling pulse comprise substantially same amplitudes and pulse periods or substantially different amplitudes and pulse periods and/or substantially same 180 degree (180°) phase differences. In an example, the cross-resonance pulse, the decoupling pulse, the phase-inverted cross-resonance pulse, and the phase-inverted decoupling pulse are at a resonant frequency of the target qubit.

In another example, as described in detail below, target qubit decoupling system 102 can further facilitate via processor 106 (e.g., a classical processor, a quantum processor, etc.): applying a first pulse signal to a control qubit having a first resonant frequency; applying a second pulse signal to a target qubit coupled to the control qubit, the target qubit having a second resonant frequency, where the first and the second pulse signals are at the second resonant frequency and in phase at the target qubit; applying a third pulse signal to the control qubit at the first resonant frequency for creating an inverted state relative to a current state of the control qubit; applying a fourth pulse signal to the control qubit; and/or applying a fifth pulse signal to the target qubit, where the fourth and the fifth pulse signals are at the second resonant frequency and are in phase at the target qubit, and where the fourth and fifth pulse signals include a substantially 180 degree (180°) phase difference relative to the respective first and second pulse signals. In an example, target qubit decoupling system 102 can further facilitate via processor 106 (e.g., a classical processor, a quantum processor, etc.): applying the first pulse signal to the control qubit and the second pulse signal to the target qubit simultaneously, where the first pulse signal propagates to the target qubit via the control qubit; and/or applying the fourth pulse signal to the control qubit and the fifth pulse signal to the target qubit simultaneously, where the fourth pulse signal propagates to the target qubit via the control qubit. In an example, the fourth and fifth pulse signals are substantially the same as the first and second pulse signals. In an example, the second and fifth pulse signals comprise substantially same amplitudes and pulse periods. In an example, the second and fifth pulse signals comprise substantially different amplitudes and pulse periods.

In another example, target qubit decoupling system 102 can further facilitate via processor 106 (e.g., a classical processor, a quantum processor, etc.): applying a cross-resonance pulse having a first pulse period to a control qubit coupled to a target qubit; applying a decoupling pulse having a second pulse period to the target qubit, where the cross-resonance pulse and the decoupling pulse are at a resonant frequency of the target qubit and in phase at the target qubit; and/or applying a phase-inverted decoupling pulse having a third pulse period to the target qubit at the resonant frequency of the target qubit and including a substantially 180 degree (180°) phase difference relative to the cross-resonance pulse and the decoupling pulse at the target qubit. In an example, as described in detail below, target qubit decoupling system 102 can further facilitate via processor 106 (e.g., a classical processor, a quantum processor, etc.): applying a first phase adjustment pulse to the control qubit at a resonant frequency of the control qubit; and/or applying a second phase adjustment pulse to the target qubit at the resonant frequency of the target qubit. In an example, as described in detail below, target qubit decoupling system 102 can further facilitate via processor 106 (e.g., a classical processor, a quantum processor, etc.): applying the cross-resonance pulse to the control qubit and the decoupling pulse to the target qubit simultaneously, where the cross-resonance pulse propagates to the target qubit via the control qubit; and/or applying the cross-resonance pulse to the control qubit and the phase-inverted decoupling pulse to the target qubit simultaneously, where the cross-resonance pulse propagates to the target qubit via the control qubit, thereby facilitating at least one of reduced operation time of a quantum gate comprising the target qubit and the control qubit or improved performance of a quantum device comprising the quantum gate. In an example, the second pulse period comprises a first defined fraction of the first pulse period, the third pulse period comprises a second defined fraction of the first pulse period, and the second pulse period and the third pulse period together equal the first pulse period. In an example, the decoupling pulse and the phase-inverted decoupling pulse comprise substantially different amplitudes and substantially same pulse periods or the decoupling pulse and the phase-inverted decoupling pulse comprise substantially same amplitudes and substantially different pulse periods.

Cross-resonance pulse component 108 can apply a first pulse signal to a control qubit (not illustrated in the figures)

having a first resonant frequency. For example, cross-resonance pulse component 108 can apply a first pulse signal comprising a cross-resonance pulse to a control qubit of a quantum gate (not illustrated in the figures) such as, for instance, a cross-resonance gate, an echoed cross-resonance gate, and/or another quantum gate, where such a control qubit can comprise a certain resonant frequency. In some embodiments, such a control qubit and/or quantum gate can be implemented in a quantum device (e.g., quantum computer, quantum processor, quantum hardware, quantum circuit, superconducting circuit, etc.) to enable one or more quantum computations and/or quantum data processing operations.

To facilitate applying such a pulse signal to a control qubit as described above, cross-resonance pulse component 108 can employ one or more signal devices (not illustrated in the figures) that can transmit and/or receive microwave pulse signals to and/or from a quantum device comprising a quantum gate and/or a control qubit (e.g., a quantum device and/or quantum gate defined above that comprise the control qubit). For example, to facilitate applying such a pulse signal to a control qubit as described above, cross-resonance pulse component 108 can employ one or more signal devices including, but not limited to, one or more arbitrary waveform generators (AWG), radio frequency (RF) electronics, and/or local oscillators to generate and/or apply the pulse signal to the control qubit. In some embodiments (not illustrated in the figures), such one or more signal devices can be coupled (e.g., communicatively, electrically, operatively, optically, etc.) to target qubit decoupling system 102 and/or one or more components thereof (e.g., memory 104, processor 106, cross-resonance pulse component 108, decoupling pulse component 110, state inversion pulse component 112, phase-inverted cross-resonance pulse component 114, phase-inverted decoupling pulse component 116, bus 118, etc.). In these embodiments, such one or more signal devices can be further coupled (e.g., communicatively, electrically, operatively, optically, etc.) to a quantum device and/or quantum gate defined above that comprise the control qubit to facilitate applying such a pulse signal to the control qubit as described above. In these embodiments, such a control qubit, quantum gate, quantum device, and/or signal device described above (e.g., arbitrary waveform generator (AWG), radio frequency (RF) electronics, local oscillator, etc.) can constitute components of system 100.

Decoupling pulse component 110 can apply a second pulse signal to a target qubit (not illustrated in the figures) coupled to a control qubit, the target qubit having a second resonant frequency, where the first and the second pulse signals are at the second resonant frequency and in phase at the target qubit. For example, decoupling pulse component 110 can apply a second pulse signal comprising a decoupling pulse to a target qubit of a quantum gate such as, for instance, the quantum gate described above comprising a control qubit (e.g., a cross-resonance gate, an echoed cross-resonance gate, etc.). In this example, the target qubit can be coupled to the control qubit, the target qubit can have a certain resonant frequency (e.g., a resonant frequency that can be different than that of the control qubit), and the first and the second pulse signals (e.g., the cross-resonance pulse and the decoupling pulse, respectively) can be at the resonant frequency of the target qubit and in phase at the target qubit (e.g., in phase upon arrival at the target qubit).

To facilitate applying such a pulse signal to a target qubit as described above, decoupling pulse component 110 can employ one or more the devices defined above that can transmit and/or receive microwave pulse signals to and/or from a quantum device comprising a quantum gate having a control qubit and a target qubit. For example, to facilitate applying such a pulse signal to a target qubit of a quantum gate as described above, decoupling pulse component 110 can employ one or more signal devices including, but not limited to, one or more arbitrary waveform generators (AWG), radio frequency (RF) electronics, and/or local oscillators to generate and/or apply the pulse signal to the target qubit. In some embodiments (not illustrated in the figures), such one or more signal devices can be coupled (e.g., communicatively, electrically, operatively, optically, etc.) to target qubit decoupling system 102 and/or one or more components thereof (e.g., memory 104, processor 106, cross-resonance pulse component 108, decoupling pulse component 110, state inversion pulse component 112, phase-inverted cross-resonance pulse component 114, phase-inverted decoupling pulse component 116, bus 118, etc.). In these embodiments, such one or more signal devices can be further coupled (e.g., communicatively, electrically, operatively, optically, etc.) to a quantum device and/or quantum gate defined above that comprise the control qubit and the target qubit to facilitate applying such a pulse signal to the control qubit and/or the target qubit as described above. In these embodiments, such a control qubit, target qubit, quantum gate, quantum device, and/or signal device described above (e.g., arbitrary waveform generator (AWG), radio frequency (RF) electronics, local oscillator, etc.) can constitute components of system 100.

In some embodiments, cross-resonance pulse component 108 and decoupling pulse component 110 can employ one or more of such devices defined above (e.g., arbitrary waveform generator (AWG), radio frequency (RF) electronics, local oscillator, etc.) to simultaneously apply the first pulse signal (e.g., the cross-resonance pulse) to a control qubit and the second pulse signal (e.g., the decoupling pulse) to a target qubit, respectively. In these embodiments, the first pulse signal (e.g., the cross-resonance pulse) and the second pulse signal (e.g., the decoupling pulse) can arrive at the target qubit simultaneously (e.g., can be received by the target qubit simultaneously). In these embodiments, the first pulse signal (e.g., the cross-resonance pulse) that can be applied to the control qubit by cross-resonance pulse component 108 as described above can propagate to the target qubit via the control qubit (e.g., due to the coupling of the target qubit to the control qubit).

State inversion pulse component 112 can apply a third pulse signal to the control qubit at the first resonant frequency for creating an inverted state relative to a current state of the control qubit. For example, state inversion pulse component 112 can apply a third pulse signal comprising a state inversion pulse to the control qubit of the quantum gate described above. In this example, state inversion pulse component 112 can apply such a pulse signal (e.g., a state inversion pulse) at the resonant frequency of the control qubit to create an inverted state (e.g., a 0 state, a 1 state, etc.) relative to a current state (e.g., a 0 state, a 1 state, etc.) of the control qubit.

To facilitate applying such a pulse signal to a control qubit as described above, state inversion pulse component 112 can employ one or more the devices defined above that can transmit and/or receive microwave pulse signals to and/or from a quantum device comprising a quantum gate having a control qubit and a target qubit. For example, to facilitate applying such a pulse signal to a control qubit of a quantum gate as described above, state inversion pulse component 112 can employ one or more signal devices including, but not limited to, one or more arbitrary waveform generators (AWG), radio frequency (RF) electronics, and/or local oscillators to generate and/or apply the pulse signal to the control qubit.

Phase-inverted cross-resonance pulse component 114 can apply a fourth pulse signal to the control qubit. For example, phase-inverted cross-resonance pulse component 114 can apply a fourth pulse signal comprising a phase-inverted cross-resonance pulse to the control qubit of the quantum gate described above. In this example, such a pulse signal (e.g., a phase-inverted cross-resonance pulse) can be at the resonant frequency of the target qubit.

To facilitate applying such a pulse signal to a control qubit as described above, phase-inverted cross-resonance pulse component 114 can employ one or more the devices defined above that can transmit and/or receive microwave pulse signals to and/or from a quantum device comprising a quantum gate having a control qubit and a target qubit. For example, to facilitate applying such a pulse signal to a control qubit of a quantum gate as described above, phase-inverted cross-resonance pulse component 114 can employ one or more signal devices including, but not limited to, one or more arbitrary waveform generators (AWG), radio frequency (RF) electronics, and/or local oscillators to generate and/or apply the pulse signal to the control qubit.

Phase-inverted decoupling pulse component 116 can apply a fifth pulse signal to the target qubit, where the fourth and the fifth pulse signals are at the second resonant frequency and are in phase at the target qubit, and where the fourth and fifth pulse signals include a substantially 180 degree (180°) phase difference relative to the respective first and second pulse signals. For example, phase-inverted decoupling pulse component 116 can apply a fifth pulse signal comprising a phase-inverted decoupling pulse to the target qubit of the quantum gate described above. In this example, the fourth and the fifth pulse signals (e.g., the phase-inverted cross-resonance pulse and the phase-inverted decoupling pulse, respectively) can be at the resonant frequency of the target qubit and in phase at the target qubit (e.g., in phase upon arrival at the target qubit). In this example, the fourth and the fifth pulse signals (e.g., the phase-inverted cross-resonance pulse and the phase-inverted decoupling pulse, respectively) that can be applied by phase-inverted cross-resonance pulse component 114 and phase-inverted decoupling pulse component 116, respectively, can comprise a substantially 180 degree (180°) phase difference relative to the respective first and second pulse signals (e.g., the cross-resonance pulse and the decoupling pulse, respectively) that can be applied by cross-resonance pulse component 108 and decoupling pulse component 110, respectively, as described above.

To facilitate applying such a pulse signal to a target qubit as described above, phase-inverted decoupling pulse component 116 can employ one or more the devices defined above that can transmit and/or receive microwave pulse signals to and/or from a quantum device comprising a quantum gate having a control qubit and a target qubit. For example, to facilitate applying such a pulse signal to a target qubit of a quantum gate as described above, phase-inverted decoupling pulse component 116 can employ one or more signal devices including, but not limited to, one or more arbitrary waveform generators (AWG), radio frequency (RF) electronics, and/or local oscillators to generate and/or apply the pulse signal to the target qubit.

In some embodiments, phase-inverted cross-resonance pulse component 114 and phase-inverted decoupling pulse component 116 can employ one or more of such devices defined above (e.g., arbitrary waveform generator (AWG), radio frequency (RF) electronics, local oscillator, etc.) to simultaneously apply the fourth pulse signal (e.g., the phase-inverted cross-resonance pulse) to a control qubit and the fifth pulse signal (e.g., the phase-inverted decoupling pulse) to a target qubit, respectively. In these embodiments, the fourth pulse signal (e.g., the phase-inverted cross-resonance pulse) and the fifth pulse signal (e.g., the phase-inverted decoupling pulse) can arrive at the target qubit simultaneously (e.g., can be received by the target qubit simultaneously). In these embodiments, the fourth pulse signal (e.g., the phase-inverted cross-resonance pulse) that can be applied to the control qubit by phase-inverted cross-resonance pulse component 114 as described above can propagate to the target qubit via the control qubit (e.g., due to the coupling of the target qubit to the control qubit).

In some embodiments, the fourth and fifth pulse signals described above (e.g., the phase-inverted cross-resonance pulse and the phase-inverted decoupling pulse, respectively) can be substantially the same as the first and second pulse signals described above (e.g., the cross-resonance pulse and the decoupling pulse, respectively). In some embodiments, the second and fifth pulse signals described above (e.g., the decoupling pulse and the phase-inverted decoupling pulse, respectively) can comprise substantially same amplitudes and pulse periods. In some embodiments, the second and fifth pulse signals described above (e.g., the decoupling pulse and the phase-inverted decoupling pulse, respectively) can comprise substantially different amplitudes and pulse periods. In some embodiments, the first and fourth pulse signals described above (e.g., the cross-resonance pulse and the phase-inverted cross-resonance pulse, respectively) can comprise substantially same amplitudes and pulse periods, as well as substantially same 180 degree (180°) phase differences. In some embodiments, the second and fourth pulse signals described above (e.g., the decoupling pulse and the phase-inverted decoupling pulse, respectively) can comprise substantially same amplitudes and pulse periods or substantially different amplitudes and pulse periods, as well as substantially same 180 degree (180°) phase differences.

Figure 2:
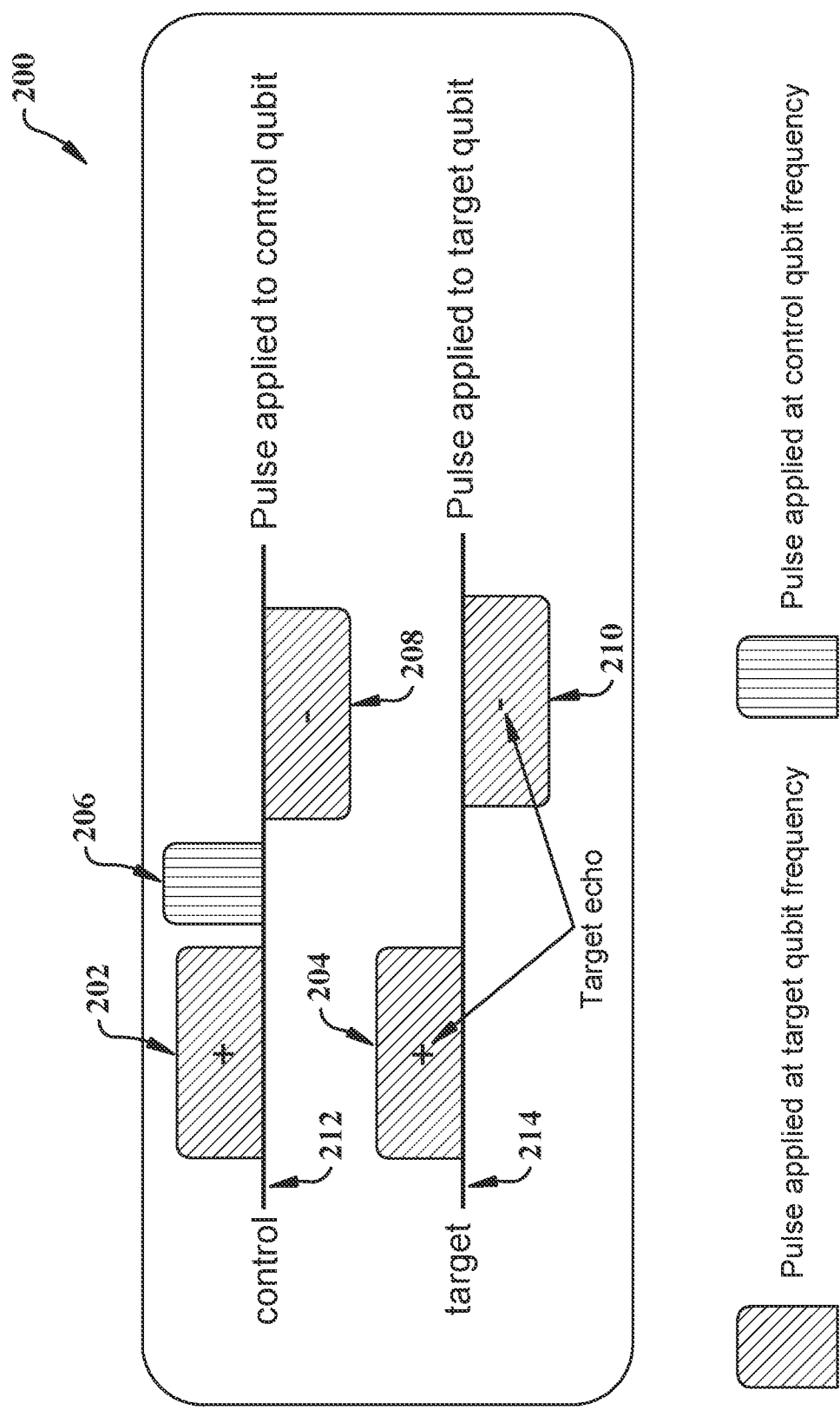
FIG. 2 illustrates a diagram of an example, non-limiting pulse diagram that can facilitate target qubit decoupling in an echoed cross-resonance gate in accordance with one or more embodiments described herein.

FIG. 2 illustrates a diagram of an example, non-limiting pulse diagram 200 that can facilitate target qubit decoupling in an echoed cross-resonance gate in accordance with one or more embodiments described herein. Repetitive description of like elements and/or processes employed in respective embodiments is omitted for sake of brevity.

Pulse diagram 200 illustrates visual representations of the pulse signals that can be generated and/or applied by target qubit decoupling system 102 to a control qubit and/or a target qubit of a quantum gate. For example, pulse signals 202, 204, 206, 208, 210 depicted in pulse diagram 200 can represent the various pulse signals that can be generated and/or applied by target qubit decoupling system 102 to a control qubit and/or a target qubit of a quantum gate (e.g., a cross-resonance gate, an echoed cross-resonance gate, etc.) as described above with reference to FIG. 1.

In an example, with reference to FIGS. 1 and 2, pulse signal 202 can represent the first pulse signal, for instance, the cross-resonance pulse, that can be applied by cross-resonance pulse component 108 to a control qubit of a quantum gate comprising the control qubit and a target qubit coupled to one another. In this example, cross-resonance pulse component 108 can apply pulse signal 202 at a resonant frequency of the target qubit via a control channel 212 as illustrated in FIG. 2.

In another example, with reference to FIGS. 1 and 2, pulse signal 204 can represent the second pulse signal, for instance, the decoupling pulse, that can be applied by decoupling pulse component 110 to the target qubit of the quantum gate described above comprising the control qubit and the target qubit coupled to one another. In this example, decoupling pulse component 110 can apply pulse signal 204 at the resonant frequency of the target qubit via a target channel 214 as illustrated in FIG. 2. In this example, as described above with reference to FIG. 1, cross-resonance pulse component 108 and decoupling pulse component 110 can respectively apply pulse signals 202, 204 such that they arrive at the target qubit simultaneously and in phase as illustrated in FIG. 2 (denoted by the "+" symbols in FIG. 2), where the first pulse signal (e.g., the cross-resonance pulse) can propagate to the target qubit via the control qubit.

In another example, with reference to FIGS. 1 and 2, pulse signal 206 can represent the third pulse signal, for instance, the state inversion pulse, that can be applied by state inversion pulse component 112 to the control qubit of the quantum gate comprising the control qubit and the target qubit coupled to one another. In this example, state inversion pulse component 112 can apply pulse signal 206 at the resonant frequency of the control qubit via control channel 212 as illustrated in FIG. 2 to create an inverted state (e.g., a 0 state, a 1 state, etc.) relative to a current state (e.g., a 0 state, a 1 state, etc.) of the control qubit.

In another example, with reference to FIGS. 1 and 2, pulse signal 208 can represent the fourth pulse signal, for instance, the phase-inverted cross-resonance pulse, that can be applied by phase-inverted cross-resonance pulse component 114 to the control qubit of the quantum gate comprising the control qubit and the target qubit coupled to one another. In this example, phase-inverted cross-resonance pulse component 114 can apply pulse signal 208 at the resonant frequency of the target qubit via control channel 212 as illustrated in FIG. 2.

In another example, with reference to FIGS. 1 and 2, pulse signal 210 can represent the fifth pulse signal, for instance, the phase-inverted decoupling pulse, that can be applied by phase-inverted decoupling pulse component 116 to the target qubit of the quantum gate described above comprising the control qubit and the target qubit coupled to one another. In this example, phase-inverted decoupling pulse component 116 can apply pulse signal 210 at the resonant frequency of the target qubit via target channel 214 as illustrated in FIG. 2. In this example, as described above with reference to FIG. 1, phase-inverted cross-resonance pulse component 114 and phase-inverted decoupling pulse component 116 can respectively apply pulse signals 208, 210 such that they arrive at the target qubit simultaneously and in phase as illustrated in FIG. 2 (denoted by the "−" symbols in FIG. 2). In this example, the fourth pulse signal (e.g., the phase-inverted cross-resonance pulse) can propagate to the target qubit via the control qubit and pulse signals 208, 210 can comprise a substantially 180 degree (180°) phase difference relative to pulse signals 202, 204, respectively, as denoted by the "+" symbols of pulse signals 202, 204 and the "−" symbols of pulse signals 208, 210 illustrated in FIG. 2.

It should be appreciated that by respectively applying pulse signals 202, 204 simultaneously at the resonant frequency of the target qubit and in phase at the target qubit and respectively applying pulse signals 208, 210 simultaneously at the resonant frequency of the target qubit and in phase at the target qubit, where pulse signals 208, 210 include a substantially 180 degree (180°) phase difference relative to pulse signals 202, 204, target qubit decoupling system 102 can thereby facilitate at least one of improved error rate of a quantum gate comprising the target qubit and the control qubit, improved fidelity of the quantum gate, or improved fidelity of a quantum device comprising the quantum gate.

Figure 3:
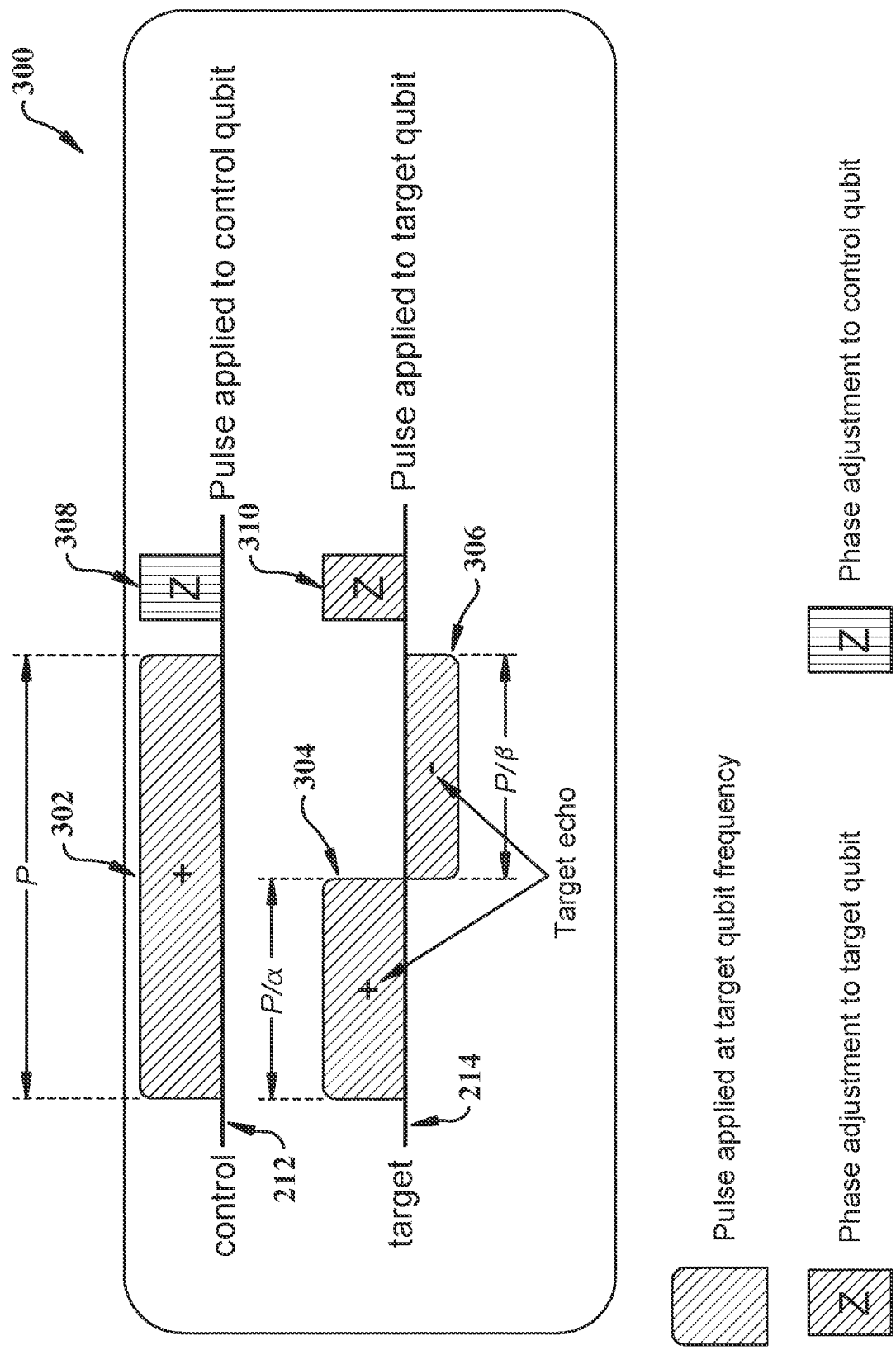
FIG. 3 illustrates a diagram of an example, non-limiting pulse diagram that can facilitate target qubit decoupling in an echoed cross-resonance gate in accordance with one or more embodiments described herein.

FIG. 3 illustrates a diagram of an example, non-limiting pulse diagram 300 that can facilitate target qubit decoupling in an echoed cross-resonance gate in accordance with one or more embodiments described herein. Repetitive description of like elements and/or processes employed in respective embodiments is omitted for sake of brevity.

Pulse diagram 300 can comprise an example, non-limiting alternative embodiment of pulse diagram 200, where pulse diagram 300 illustrates visual representations of example, non-limiting alternative pulse signals that can be generated and/or applied by target qubit decoupling system 102 to a control qubit and/or a target qubit of a quantum gate (e.g., a cross-resonance gate, an echoed cross-resonance gate, etc.). For example, pulse diagram 300 illustrates visual representations of example, non-limiting pulse signals that are alternative to the first, second, third, fourth, and/or fifth pulse signals (e.g., pulse signals 202, 204, 206, 208, 210, respectively) described above with reference to FIGS. 1 and 2. For instance, pulse signals 302, 304, 306, 308, 310 depicted in pulse diagram 300 can represent the various alternative pulse signals that can be generated and/or applied by target qubit decoupling system 102 to a control qubit and/or a target qubit of a quantum gate as described below and above with reference to FIG. 1.

In an example, with reference to FIGS. 1, 2, and 3, pulse signal 302 can represent an example, non-limiting pulse signal that is an alternative to pulse signal 202, where cross-resonance pulse component 108 can apply pulse signal 302 to a control qubit of a quantum gate comprising the control qubit and a target qubit coupled to one another. In this example, cross-resonance pulse component 108 can apply (e.g., via an arbitrary waveform generator (AWG), radio frequency (RF) electronics, local oscillator, etc.) pulse signal 302 at a resonant frequency of the target qubit via control channel 212 as illustrated in FIG. 3. In this example, pulse signal 302 can comprise a cross-resonance pulse having a first pulse period as illustrated in FIG. 3 (e.g., a pulse period of P).

In another example, with reference to FIGS. 1, 2, and 3, pulse signal 304 can represent an example, non-limiting pulse signal that is an alternative to pulse signal 204, where decoupling pulse component 110 can apply pulse signal 304 to a target qubit of a quantum gate comprising a control qubit and the target qubit coupled to one another. In this example, decoupling pulse component 110 can apply (e.g., via an arbitrary waveform generator (AWG), radio frequency (RF) electronics, local oscillator, etc.) pulse signal 304 at a resonant frequency of the target qubit via target channel 214 as illustrated in FIG. 3. In this example, as illustrated in FIG. 3, pulse signal 304 can comprise a decoupling pulse having a second pulse period comprising a first defined fraction P/α of the first pulse period P of pulse signal 302, where P and/or P/α can be defined by an entity employing target qubit decoupling system 102 (e.g., an entity such as, for instance, a human, a client, a user, a computing device, a software application, an agent, a machine learning (ML) model, an artificial intelligence (AI) model, etc.). In this example, pulse signals 302, 304 can be in phase at the target qubit (e.g., in phase upon arrival at the target qubit as illustrated in FIG. 3). For instance, cross-resonance pulse component 108 and decoupling pulse component 110 can respectively apply pulse signals 302, 304 (e.g., the cross-resonance pulse having a pulse period P and the decoupling pulse having a pulse period P/α, respectively) such that they arrive at the target qubit simultaneously and in phase as illustrated in FIG. 3, where pulse signal 302 (e.g., the cross-resonance pulse having a pulse period P) can propagate to the target qubit via the control qubit.

In another example, with reference to FIGS. 1, 2, and 3, pulse signal 306 can represent an example, non-limiting pulse signal that is an alternative to pulse signal 210, where phase-inverted decoupling pulse component 116 can apply pulse signal 306 to a target qubit of a quantum gate comprising a control qubit and the target qubit coupled to one another. In this example, phase-inverted decoupling pulse component 116 can apply (e.g., via an arbitrary waveform generator (AWG), radio frequency (RF) electronics, local oscillator, etc.) pulse signal 306 at a resonant frequency of the target qubit via target channel 214. In this example, as illustrated in FIG. 3, pulse signal 306 can comprise a phase-inverted decoupling pulse having a third pulse period comprising a second defined fraction $P/\beta$ of the first pulse period P of pulse signal 302, where P and/or $P/\beta$ can be defined by an entity employing target qubit decoupling system 102 (e.g., an entity such as, for instance, a human, a client, a user, a computing device, a software application, an agent, a machine learning (ML) model, an artificial intelligence (AI) model, etc.). In this example, pulse signal 306 can comprise a substantially 180 degree (180°) phase difference relative to pulse signals 302, 304 at the target qubit (e.g., a substantially 180 degree (180°) phase difference as denoted by the "−" symbol of pulse signal 306 and the "+" symbols of pulse signals 302, 304 illustrated in FIG. 3). For instance, cross-resonance pulse component 108 and phase-inverted decoupling pulse component 116 can respectively apply pulse signals 302, 306 (e.g., the cross-resonance pulse having a pulse period P and the phase-inverted decoupling pulse having a pulse period $P/\beta$, respectively) such that they arrive at the target qubit simultaneously and with a substantially 180 degree (180°) phase difference relative to one another (e.g., as denoted by the "−" symbol of pulse signal 306 and the "+" symbol of pulse signal 302 illustrated in FIG. 3). In these examples, pulse signal 302 (e.g., the cross-resonance pulse having a pulse period P) can propagate to the target qubit via the control qubit.

It should be appreciated that by respectively applying pulse signals 302, 304 simultaneously at the resonant frequency of the target qubit and in phase at the target qubit and respectively applying pulse signals 302, 306 simultaneously at the resonant frequency of the target qubit and with a substantially 180 degree (180°) phase difference relative to one another at the target qubit, target qubit decoupling system 102 can thereby facilitate at least one of reduced operation time of a quantum gate comprising the target qubit and the control qubit or improved performance of a quantum device comprising the quantum gate.

In some embodiments, when combined (e.g., added together), the pulse period $P/\alpha$ of pulse signal 304 and the pulse period $P/\beta$ of pulse signal 306 can equal the pulse period P of pulse signal 302 as illustrated in FIG. 3 (e.g., $P/\alpha + P/\beta = P$). In some embodiments, pulse signal 304 (e.g., the decoupling pulse) and pulse signal 306 (e.g., the phase-inverted decoupling pulse) can comprise substantially different amplitudes and substantially same pulse periods. For instance, as illustrated in FIG. 3, the amplitude of pulse signal 304 can be substantially different (e.g., larger) than the amplitude of pulse signal 306 and the pulse period $P/\alpha$ of pulse signal 304 can be substantially the same as the pulse period $P/\beta$ of pulse signal 306 (e.g., $P/\alpha = P/\beta = P/2$). In some embodiments (not illustrated in the figures), pulse signal 304 (e.g., the decoupling pulse) and pulse signal 306 (e.g., the phase-inverted decoupling pulse) can comprise substantially same amplitudes and substantially different pulse periods (e.g., $P/\alpha \neq P/\beta$).

In some embodiments, target qubit decoupling system 102 can further comprise a phase adjustment component (not illustrated in the figures) that can apply a phase adjustment pulse comprising pulse signal 308 to the control qubit (e.g., via control channel 212) at a resonant frequency of the control qubit and/or a phase adjustment pulse comprising pulse signal 310 to the target qubit (e.g., via target channel 214) at the resonant frequency of the target qubit as illustrated in FIG. 3. In these embodiments, such phase adjustment pulses (e.g., pulse signals 308, 310) can be virtual or a real pulse. If they are virtual phase adjustments (e.g., not real pulses), they can be implemented through bookkeeping as an update to the angle of all subsequent real pulses.

Figure 4:
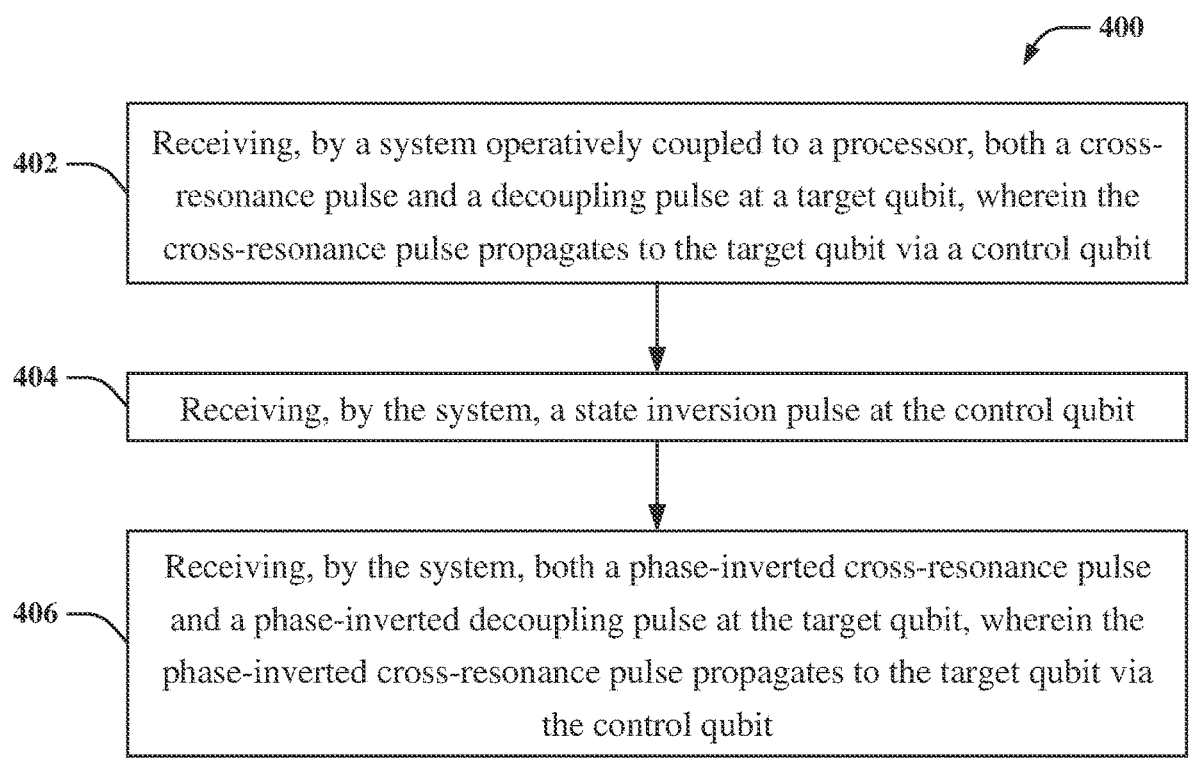
FIG. 4 illustrates a flow diagram of an example, non-limiting computer-implemented method that can facilitate target qubit decoupling in an echoed cross-resonance gate in accordance with one or more embodiments described herein.

FIG. 4 illustrates a flow diagram of an example, non-limiting computer-implemented method 400 that can facilitate target qubit decoupling in an echoed cross-resonance gate in accordance with one or more embodiments described herein. Repetitive description of like elements and/or processes employed in respective embodiments is omitted for sake of brevity.

At 402, computer-implemented method 400 can comprise receiving, by a system (e.g., via target qubit decoupling system 102, cross-resonance pulse component 108, decoupling pulse component 110, etc.) operatively coupled to a processor (e.g., processor 106, a quantum processor, etc.), both a cross-resonance pulse (e.g., pulse signal 202 described above and illustrated in FIG. 2) and a decoupling pulse (e.g., pulse signal 204 described above and illustrated in FIG. 2) at a target qubit, where the cross-resonance pulse propagates to the target qubit via a control qubit (e.g., as described above with reference to FIGS. 1 and 2).

At 404, computer-implemented method 400 can comprise receiving, by the system (e.g., via target qubit decoupling system 102, state inversion pulse component 112, etc.), a state inversion pulse (e.g., pulse signal 206 described above and illustrated in FIG. 2) at the control qubit.

At 406, computer-implemented method 400 can comprise receiving, by the system (e.g., via target qubit decoupling system 102, phase-inverted cross-resonance pulse component 114, phase-inverted decoupling pulse component 116, etc.), both a phase-inverted cross-resonance pulse (e.g., pulse signal 208 described above and illustrated in FIG. 2) and a phase-inverted decoupling pulse (e.g., pulse signal 210 described above and illustrated in FIG. 2) at the target qubit, where the phase-inverted cross-resonance pulse propagates to the target qubit via the control qubit (e.g., as described above with reference to FIGS. 1 and 2).

Figure 5:
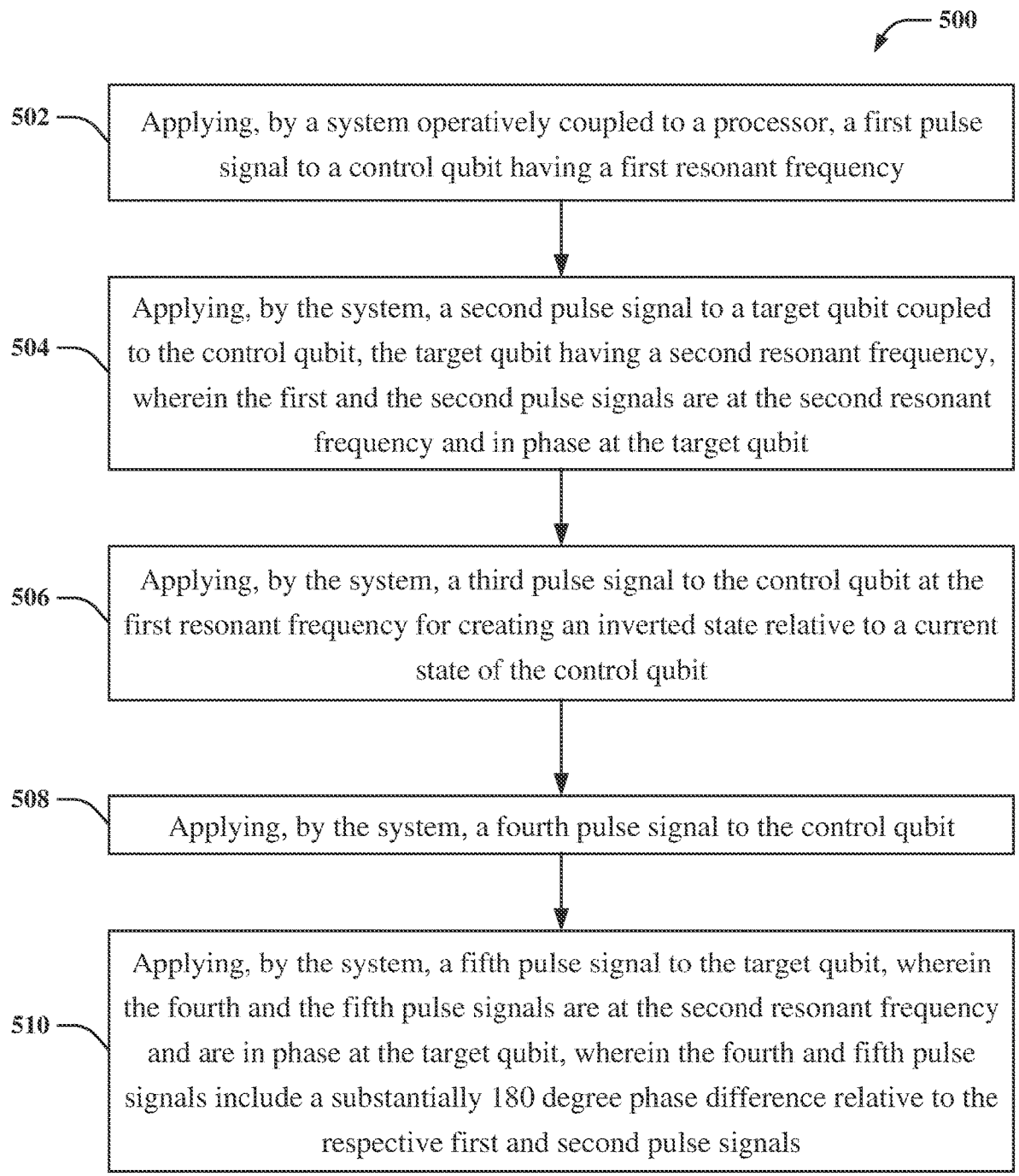
FIG. 5 illustrates a flow diagram of an example, non-limiting computer-implemented method that can facilitate target qubit decoupling in an echoed cross-resonance gate in accordance with one or more embodiments described herein.

FIG. 5 illustrates a flow diagram of an example, non-limiting computer-implemented method 500 that can facilitate target qubit decoupling in an echoed cross-resonance gate in accordance with one or more embodiments described herein. Repetitive description of like elements and/or processes employed in respective embodiments is omitted for sake of brevity.

At 502, computer-implemented method 500 can comprise applying, by a system (e.g., via target qubit decoupling system 102, cross-resonance pulse component 108, etc.) operatively coupled to a processor (e.g., processor 106, a quantum processor, etc.), a first pulse signal (e.g., pulse signal 202 described above and illustrated in FIG. 2) to a control qubit having a first resonant frequency (e.g., as described above with reference to FIGS. 1 and 2).

At 504, computer-implemented method 500 can comprise applying, by the system (e.g., via target qubit decoupling system 102, decoupling pulse component 110, etc.), a second pulse signal (e.g., pulse signal 204 described above and illustrated in FIG. 2) to a target qubit coupled to the control qubit, the target qubit having a second resonant frequency, where the first and the second pulse signals are at the second resonant frequency and in phase at the target qubit (e.g., as described above with reference to FIGS. 1 and 2).

At 506, computer-implemented method 500 can comprise applying, by the system (e.g., via target qubit decoupling system 102, state inversion pulse component 112, etc.), a third pulse signal (e.g., pulse signal 206 described above and illustrated in FIG. 2) to the control qubit at the first resonant frequency for creating an inverted state relative to a current state of the control qubit (e.g., as described above with reference to FIGS. 1 and 2).

At 508, computer-implemented method 500 can comprise applying, by the system (e.g., via target qubit decoupling system 102, phase-inverted cross-resonance pulse component 114, etc.), a fourth pulse signal (e.g., pulse signal 208 described above and illustrated in FIG. 2) to the control qubit.

At 510, computer-implemented method 500 can comprise applying, by the system (e.g., via target qubit decoupling system 102, phase-inverted decoupling pulse component 116, etc.), a fifth pulse signal (e.g., pulse signal 210 described above and illustrated in FIG. 2) to the target qubit, where the fourth and the fifth pulse signals are at the second resonant frequency and are in phase at the target qubit (e.g., as described above with reference to FIGS. 1 and 2), and where the fourth and fifth pulse signals include a substantially 180 degree (180°) phase difference relative to the respective first and second pulse signals (e.g., as described above with reference to FIGS. 1 and 2).

Figure 6:
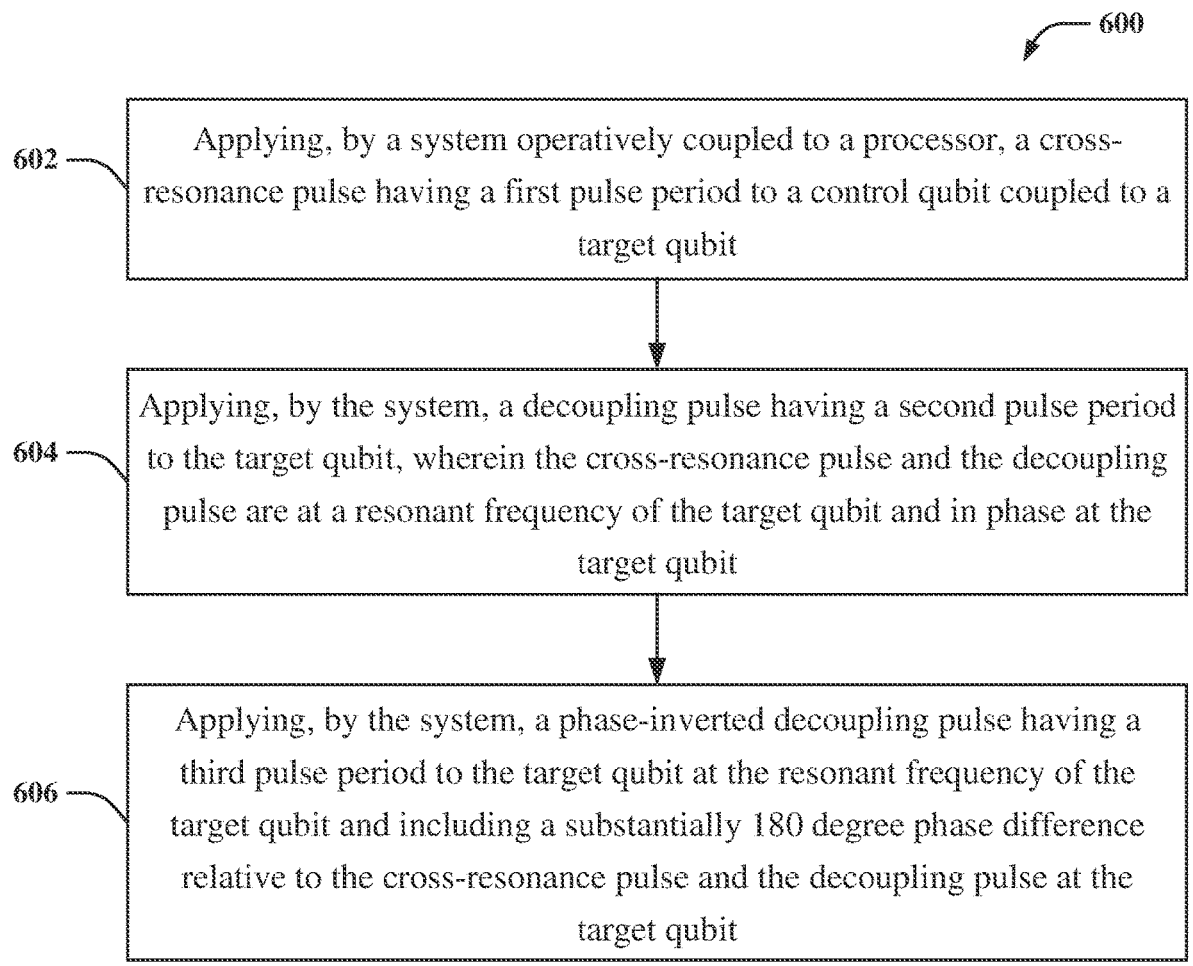
FIG. 6 illustrates a flow diagram of an example, non-limiting computer-implemented method that can facilitate target qubit decoupling in an echoed cross-resonance gate in accordance with one or more embodiments described herein.

FIG. 6 illustrates a flow diagram of an example, non-limiting computer-implemented method 600 that can facilitate target qubit decoupling in an echoed cross-resonance gate in accordance with one or more embodiments described herein. Repetitive description of like elements and/or processes employed in respective embodiments is omitted for sake of brevity.

At 602, computer-implemented method 600 can comprise applying, by a system (e.g., via target qubit decoupling system 102, cross-resonance pulse component 108, etc.) operatively coupled to a processor (e.g., processor 106, a quantum processor, etc.), a cross-resonance pulse having a first pulse period (e.g., pulse signal 302 described above and illustrated in FIG. 3) to a control qubit coupled to a target qubit (e.g., a control qubit and a target qubit of a quantum gate such as, for instance, a cross-resonance gate, an echoed cross-resonance gate, etc.).

At 604, computer-implemented method 600 can comprise applying, by the system (e.g., via target qubit decoupling system 102, decoupling pulse component 110, etc.), a decoupling pulse having a second pulse period (e.g., pulse signal 304 described above and illustrated in FIG. 3) to the target qubit, where the cross-resonance pulse and the decoupling pulse are at a resonant frequency of the target qubit and in phase at the target qubit (e.g., in phase upon arrival at the target qubit as described above and illustrated in FIG. 3).

At 606, computer-implemented method 600 can comprise applying, by the system (e.g., via target qubit decoupling system 102, phase-inverted decoupling pulse component 116, etc.), a phase-inverted decoupling pulse having a third pulse period (e.g., pulse signal 306 described above and illustrated in FIG. 3) to the target qubit at the resonant frequency of the target qubit and including a substantially 180 degree (180°) phase difference relative to the cross-resonance pulse and the decoupling pulse at the target qubit (e.g., including a substantially 180 degree (180°) phase difference as denoted by the "−" symbol of pulse signal 306 and the "+" symbols of pulse signals 302, 304 illustrated in FIG. 3).

Figure 7:
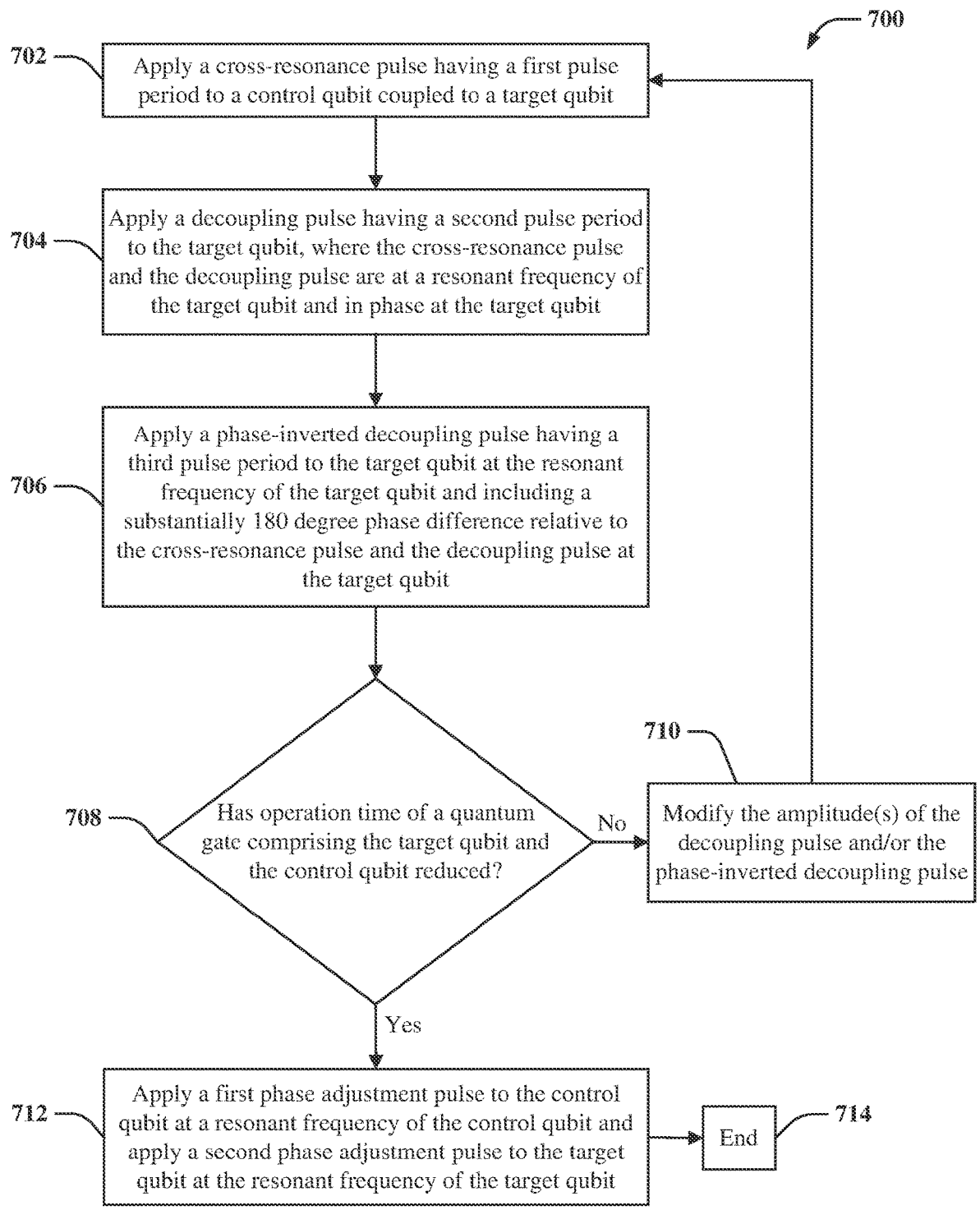
FIG. 7 illustrates a flow diagram of an example, non-limiting computer-implemented method that can facilitate target qubit decoupling in an echoed cross-resonance gate in accordance with one or more embodiments described herein.

FIG. 7 illustrates a flow diagram of an example, non-limiting computer-implemented method 700 that can facilitate target qubit decoupling in an echoed cross-resonance gate in accordance with one or more embodiments described herein. Repetitive description of like elements and/or processes employed in respective embodiments is omitted for sake of brevity.

At 702, computer-implemented method 700 can comprise applying (e.g., via target qubit decoupling system 102, cross-resonance pulse component 108, etc.) a cross-resonance pulse having a first pulse period (e.g., pulse signal 302 described above and illustrated in FIG. 3) to a control qubit coupled to a target qubit (e.g., a control qubit and a target qubit of a quantum gate such as, for instance, a cross-resonance gate, an echoed cross-resonance gate, etc.).

At 704, computer-implemented method 700 can comprise applying (e.g., via target qubit decoupling system 102, decoupling pulse component 110, etc.) a decoupling pulse having a second pulse period (e.g., pulse signal 304 described above and illustrated in FIG. 3) to the target qubit, where the cross-resonance pulse and the decoupling pulse are at a resonant frequency of the target qubit and in phase at the target qubit (e.g., in phase upon arrival at the target qubit as described above and illustrated in FIG. 3).

At 706, computer-implemented method 700 can comprise applying (e.g., via target qubit decoupling system 102, phase-inverted decoupling pulse component 116, etc.) a phase-inverted decoupling pulse having a third pulse period (e.g., pulse signal 306 described above and illustrated in FIG. 3) to the target qubit at the resonant frequency of the target qubit and including a substantially 180 degree (180°) phase difference relative to the cross-resonance pulse and the decoupling pulse at the target qubit (e.g., including a substantially 180 degree (180°) phase difference as denoted by the "−" symbol of pulse signal 306 and the "+" symbols of pulse signals 302, 304 illustrated in FIG. 3).

In some embodiments, as described above with reference to FIG. 3, the cross-resonance pulse applied to the control qubit at 702 and the decoupling pulse applied to the target qubit at 704 can be applied simultaneously by cross-resonance pulse component 108 and decoupling pulse component 110, respectively, where the cross-resonance pulse can propagate to the target qubit via the control qubit. In these embodiments, the cross-resonance pulse applied to the control qubit at 702 and the phase-inverted decoupling pulse applied to the target qubit at 706 can be applied simultaneously by cross-resonance pulse component 108 and phase-inverted decoupling pulse component 116, respectively, where the cross-resonance pulse can propagate to the target qubit via the control qubit. In these embodiments, target qubit decoupling system 102 can thereby facilitate at least one of reduced operation time of a quantum gate comprising the target qubit and the control qubit or improved performance of a quantum device comprising the quantum gate.

At 708, computer-implemented method 700 can comprise determining (e.g., via target qubit decoupling system 102, an entity defined above, etc.) whether operation time of a quantum gate comprising the target qubit and the control qubit has reduced. If it is determined at 708 that operation time of such a quantum gate comprising the target qubit and the control qubit has not reduced, at 710, computer-implemented method 700 can comprise modifying (e.g., via target qubit decoupling system 102, an entity defined above, etc.) the amplitude(s) of the decoupling pulse and/or the phase-inverted decoupling pulse and repeating steps 702, 704, and 706 using such modified amplitude(s).

If it is determined at 708 that operation time of such a quantum gate comprising the target qubit and the control qubit has reduced, at 712, computer-implemented method 700 can comprise applying (e.g., via target qubit decoupling system 102, a phase adjustment component of target qubit decoupling system 102 (not illustrated in the figures), an entity defined above, etc.) a first phase adjustment pulse (e.g., pulse signal 308 described above and illustrated in FIG. 3) to the control qubit at a resonant frequency of the control qubit and applying (e.g., via target qubit decoupling system 102, a phase adjustment component of target qubit decoupling system 102 (not illustrated in the figures), an entity defined above, etc.) a second phase adjustment pulse (e.g., pulse signal 310 described above and illustrated in FIG. 3) to the target qubit at the resonant frequency of the target qubit. At 714, computer-implemented method 700 can comprise ending.

Target qubit decoupling system 102 can be associated with various technologies. For example, target qubit decoupling system 102 can be associated with qubit technologies, quantum gate technologies, cross-resonance quantum gate technologies, echoed cross-resonance quantum gate technologies, quantum device technologies, microwave signal processing technologies, artificial intelligence technologies, machine learning technologies, quantum computing technologies, computer technologies, server technologies, cloud computing technologies, information technology (IT) technologies, internet-of-things (IoT) technologies, automation technologies, and/or other technologies.

Target qubit decoupling system 102 can provide technical improvements to systems, devices, components, operational steps, and/or processing steps associated with the various technologies identified above. For example, by simultaneously applying both cross-resonance pulses and decoupling pulses to a target qubit that are in phase at the target qubit, target qubit decoupling system 102 can reduce the impact that undesired error sources (e.g., coherent error sources) apply to two-qubit gates (e.g., a cross-resonance gate, an echoed cross-resonance gate, etc.) during gate operation. By reducing the affect that such undesired error sources apply to such two-qubit gates, target qubit decoupling system 102 can thereby improve computational power (e.g., efficiency, performance, fidelity, computational costs, etc.) of a quantum computer comprising such gates. For instance, target qubit decoupling system 102 can thereby facilitate at least one of improved error rate of a quantum gate comprising the target qubit and the control qubit, improved fidelity of the quantum gate, or improved fidelity of a quantum device comprising the quantum gate.

Target qubit decoupling system 102 can provide technical improvements to a processing unit (e.g., processor 106) associated with a classical computing device and/or a quantum computing device (e.g., a quantum processor, quantum hardware, superconducting circuit, etc.). For example, by reducing the affect that undesired error sources (e.g., coherent error sources) apply to two-qubit gates, target qubit decoupling system 102 can thereby improve at least one of accuracy, efficiency, performance, or fidelity of a processing unit (e.g., processor 106, a quantum processor, etc.) comprising such gates. Such improvement(s) to such a processing unit can further reduce computational costs of the processing unit.

A practical application of target qubit decoupling system 102 is that it can be implemented in a quantum computing device (e.g., a quantum processor, a quantum computer, etc.) to improve processing performance of such a device, which can facilitate fast and/or possibly universal quantum computing. Such a practical application can improve the output (e.g., computation and/or processing results) of one or more compilation jobs (e.g., quantum computing jobs) that are executed on such a device(s).

It should be appreciated that target qubit decoupling system 102 provides a new approach for reducing error rates of quantum gates in quantum devices which is driven by relatively new quantum computing technologies. For example, target qubit decoupling system 102 provide a new approach for reducing error rates of two-qubit quantum gates (e.g., a cross-resonance gate, an echoed cross-resonance gate, etc.) that can be implemented in a quantum device (e.g., quantum processor, quantum computer, quantum circuit, quantum hardware, etc.) to improve fidelity and/or performance of such a quantum device.

Target qubit decoupling system 102 can employ hardware or software to solve problems that are highly technical in nature, that are not abstract and that cannot be performed as a set of mental acts by a human. Some of the processes described herein can be performed by one or more specialized computers (e.g., one or more specialized processing units, a specialized quantum computer, etc.) for carrying out defined tasks related to the various technologies identified above. Target qubit decoupling system 102 and/or components thereof, can be employed to solve new problems that arise through advancements in technologies mentioned above, employment of quantum computing systems, cloud computing systems, computer architecture, and/or another technology.

It is to be appreciated that target qubit decoupling system 102 can utilize various combinations of electrical components, mechanical components, and circuitry that cannot be replicated in the mind of a human or performed by a human, as the various operations that can be executed by target qubit decoupling system 102 and/or components thereof as described herein are operations that are greater than the capability of a human mind. For instance, the amount of data processed, the speed of processing such data, or the types of data processed by target qubit decoupling system 102 over a certain period of time can be greater, faster, or different than the amount, speed, or data type that can be processed by a human mind over the same period of time.

According to several embodiments, target qubit decoupling system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that target qubit decoupling system 102 can include information that is impossible to obtain manually by an entity, such as a human user. For example, the type, amount, or variety of information included in target qubit decoupling system 102, cross-resonance pulse component 108, decoupling pulse component 110, state inversion pulse component 112, phase-inverted cross-resonance pulse component 114, and/or phase-inverted decoupling pulse component 116 can be more complex than information obtained manually by a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be performed to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
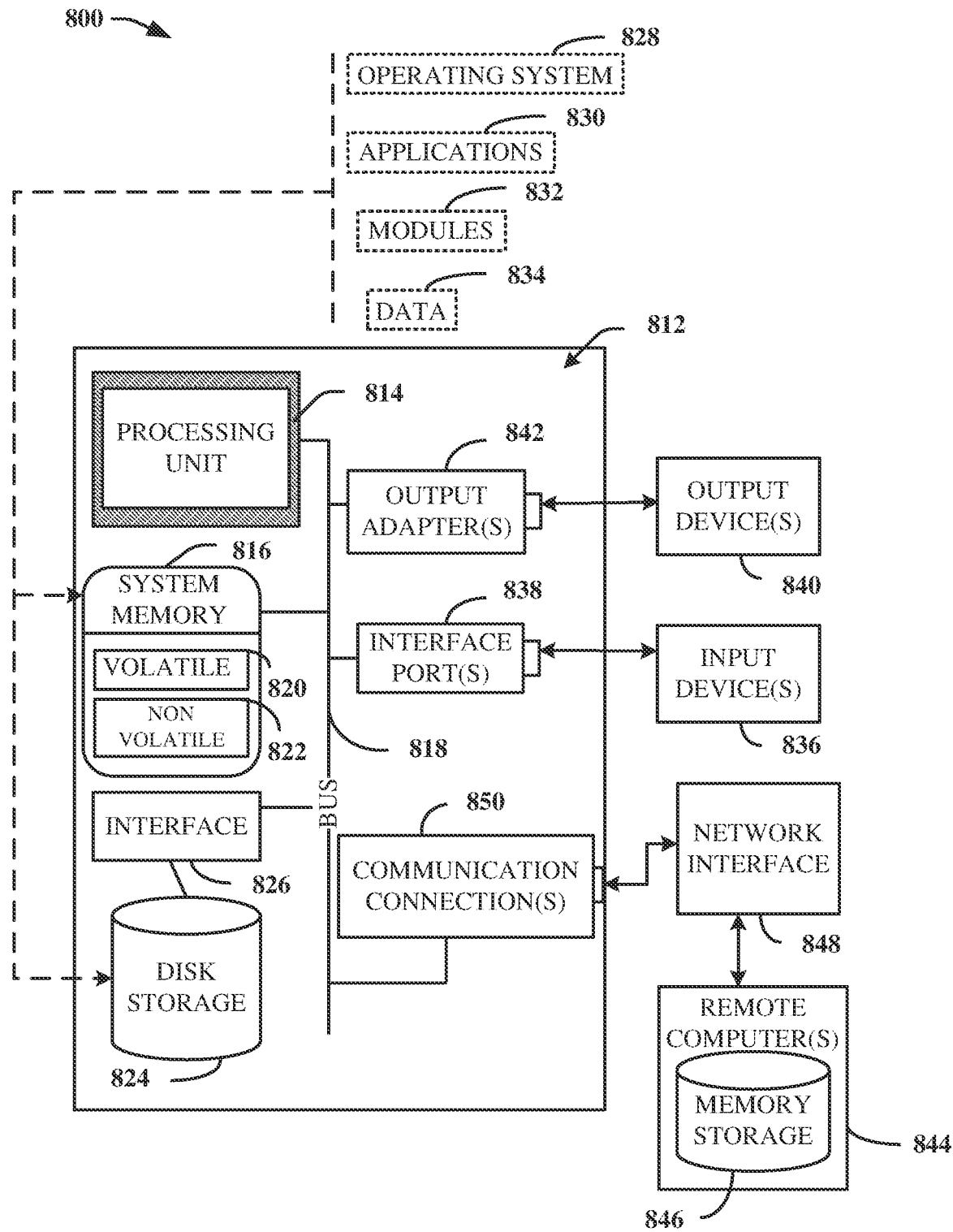
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
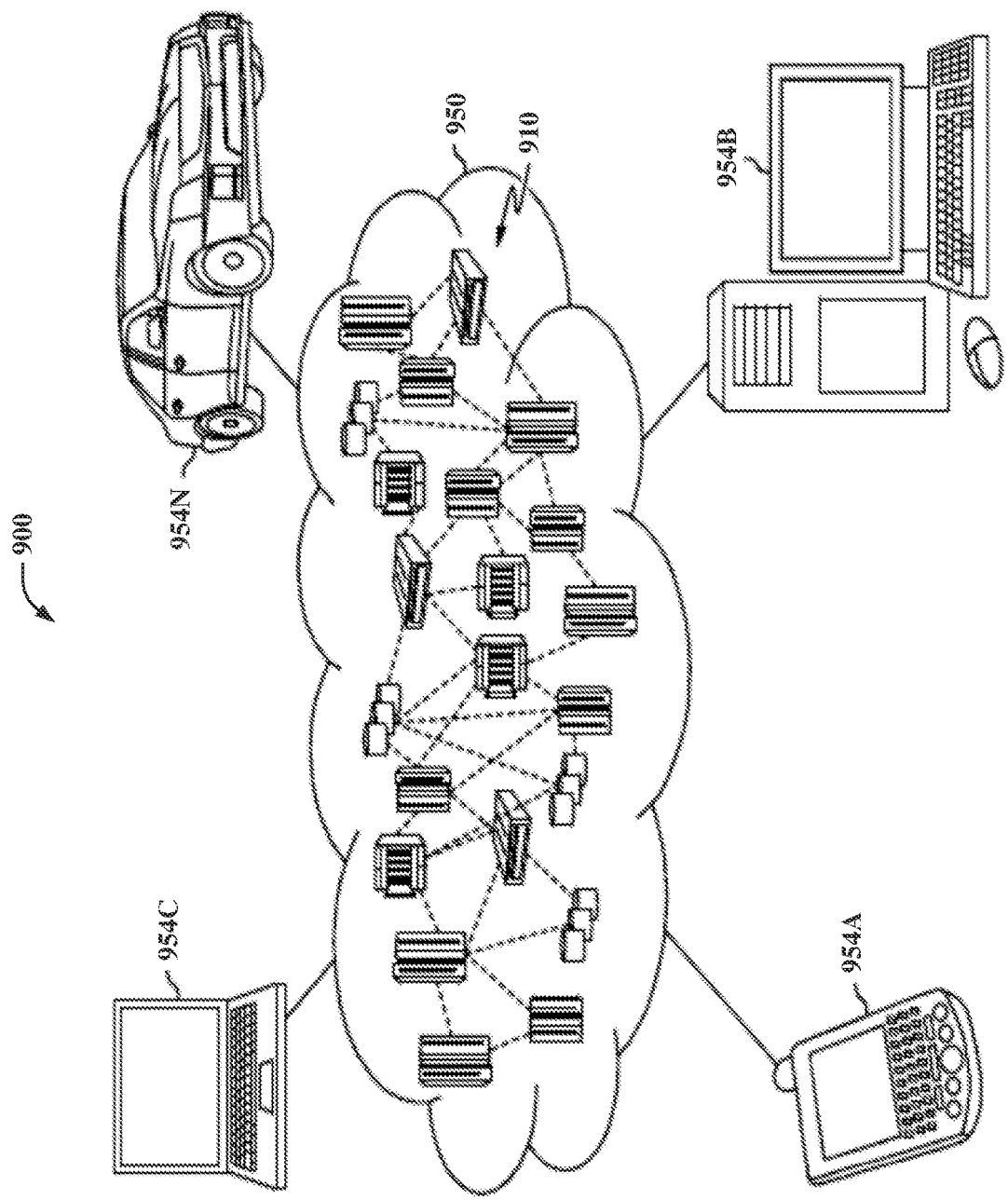
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
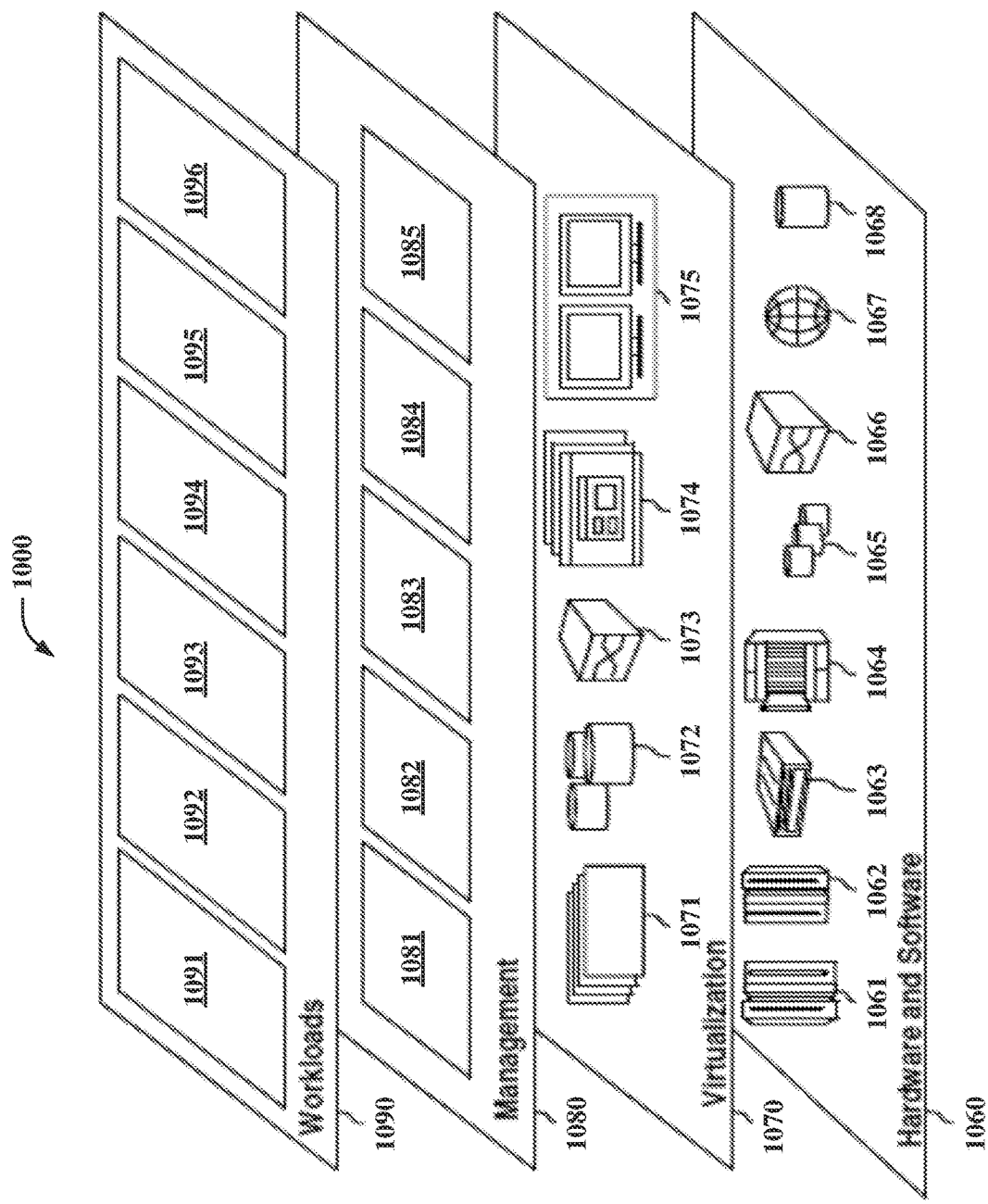
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and target qubit decoupling software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of entangling qubits, comprising:
    applying, by a system operatively coupled to a processor, a first pulse signal to a control qubit having a first resonant frequency;
    applying, by the system, a second pulse signal to a target qubit coupled to the control qubit, the target qubit having a second resonant frequency, wherein the first and the second pulse signals are at the second resonant frequency and in phase at the target qubit;
    applying, by the system, a third pulse signal to the control qubit at the first resonant frequency for creating an inverted state relative to a current state of the control qubit;
    applying, by the system, a fourth pulse signal to the control qubit; and
    applying, by the system, a fifth pulse signal to the target qubit, wherein the fourth and the fifth pulse signals are at the second resonant frequency and are in phase at the target qubit,
    wherein the fourth and fifth pulse signals include a substantially 180 degree phase difference relative to the respective first and second pulse signals.

2. The computer-implemented method of claim 1, wherein the fourth and fifth pulse signals are substantially the same as the first and second pulse signals.

3. The computer-implemented method of claim 1, wherein the second and fifth pulse signals comprise substantially same amplitudes and pulse periods.

4. The computer-implemented method of claim 1, wherein the second and fifth pulse signals comprise substantially different amplitudes and pulse periods.

5. The computer-implemented method of claim 1, further comprising:
    applying, by the system, the first pulse signal to the control qubit and the second pulse signal to the target qubit simultaneously, wherein the first pulse signal propagates to the target qubit via the control qubit; and applying, by the system, the fourth pulse signal to the control qubit and the fifth pulse signal to the target qubit simultaneously, wherein the fourth pulse signal propagates to the target qubit via the control qubit.

6. A system, comprising:
- a memory that stores computer executable components; and
- a processor that executes the computer executable components stored in the memory, wherein the computer executable components comprise:
  - a cross-resonance pulse component that applies a first pulse signal to a control qubit having a first resonant frequency;
  - a decoupling pulse component that applies a second pulse signal to a target qubit coupled to the control qubit, the target qubit having a second resonant frequency, wherein the first and the second pulse signals are at the second resonant frequency and in phase at the target qubit;
  - a state inversion pulse component that applies a third pulse signal to the control qubit at the first resonant frequency for creating an inverted state relative to a current state of the control qubit;
  - a phase-inverted cross-resonance pulse component that applies a fourth pulse signal to the control qubit; and
  - a phase-inverted decoupling pulse component that applies a fifth pulse signal to the target qubit, wherein the fourth and the fifth pulse signals are at the second resonant frequency and are in phase at the target qubit,
  wherein the fourth and fifth pulse signals include a substantially 180 degree phase difference relative to the respective first and second pulse signals.

7. The system of claim 6, wherein the fourth and fifth pulse signals are substantially the same as the first and second pulse signals.

8. The system of claim 6, wherein the second and fifth pulse signals comprise substantially same amplitudes and pulse periods.

9. The system of claim 6, wherein the second and fifth pulse signals comprise substantially different amplitudes and pulse periods.

10. The system of claim 6, wherein:
- the cross-resonance pulse component and the decoupling pulse component respectively apply the first pulse signal and the second pulse signal simultaneously, wherein the first pulse signal propagates to the target qubit via the control qubit; and
- the phase-inverted cross-resonance pulse component and the phase-inverted decoupling pulse component respectively apply the fourth pulse signal and the fifth pulse signal simultaneously, wherein the fourth pulse signal propagates to the target qubit via the control qubit.

* * * * *